(12) United States Patent
Pulliam et al.

(10) Patent No.: US 8,220,818 B1
(45) Date of Patent: Jul. 17, 2012

(54) SLIDING TOWING ASSEMBLY

(75) Inventors: Andrew Pulliam, Mishawaka, IN (US);
William A. Aske, Bristol, IN (US);
Wayne E. Hartman, Elkhart, IN (US)

(73) Assignee: Pulliam Enterprises, Inc., Mishawaka, IN (US)

( * ) Notice: Subject to any disclaimer, the term of this patent is extended or adjusted under 35 U.S.C. 154(b) by 0 days.

(21) Appl. No.: 12/954,340

(22) Filed: Nov. 24, 2010

(51) Int. Cl.
*B62D 53/06* (2006.01)
(52) U.S. Cl. ..................................... 280/441; 280/441.1
(58) Field of Classification Search .................. 280/441, 280/438.1, 441.1, 432, 901
See application file for complete search history.

(56) References Cited

U.S. PATENT DOCUMENTS

| | | | |
|---|---|---|---|
| 2,078,492 A * | 4/1937 | Gurton et al. ............... | 280/438.1 |
| 5,135,248 A * | 8/1992 | Keiserman .................... | 280/432 |
| 5,165,714 A * | 11/1992 | Kaim ............................. | 280/433 |
| 5,411,281 A * | 5/1995 | Poirier .......................... | 280/433 |
| 5,449,191 A * | 9/1995 | Cattau ....................... | 280/438.1 |
| 6,065,766 A | 5/2000 | Pulliam | |
| 6,308,977 B1 | 10/2001 | Pulliam et al. | |
| 6,554,310 B2 * | 4/2003 | Babin ......................... | 280/441.1 |
| 7,506,886 B2 * | 3/2009 | Warnock .................... | 280/438.1 |
| 7,654,553 B2 | 2/2010 | Shirk | |
| 7,703,792 B1 * | 4/2010 | Heitzmann et al. ........ | 280/455.1 |
| 7,726,678 B1 * | 6/2010 | Connell et al. ............... | 280/441 |
| 7,753,392 B2 * | 7/2010 | Warnock ....................... | 280/477 |
| 7,766,361 B2 * | 8/2010 | Hungerink et al. ........... | 280/433 |

* cited by examiner

*Primary Examiner* — Tashiana Adams
(74) *Attorney, Agent, or Firm* — Botkin & Hall, LLP (57) ABSTRACT

A hitch for coupling a trailer to a towing vehicle includes a hitch assembly and a base assembly. The hitch assembly pivots between an aligned position and a turning position as the towing vehicle turns. A bearing assembly rides between the hitch assembly and the base assembly. The bearing assembly guides the hitch assembly between the turning and aligned positions. The base assembly has an anchor assembly which prevents the hitch assembly from sliding fore or aft when in the aligned position.

20 Claims, 11 Drawing Sheets

SLIDING TOWING ASSEMBLY

BACKGROUND OF THE INVENTION

Fifth wheel trailers and tow vehicles for fifth wheel trailers are generally well known in the art. Fifth wheel trailers are much longer, roomier, and heavier than typical tent campers and travel trailers, and thus a fifth wheel trailer typically requires a specially modified, relatively heavy tow vehicle such as a heavy duty pickup truck. The front portion of a fifth wheel trailer extends over the rear portion of the tow vehicle so that a portion of the trailer's weight is carried over the rear axle of the tow vehicle. In order to accommodate the weight of the trailer, a special hitch assembly is required. The vehicle most commonly used to tow fifth wheel trailers is a pickup truck having an 8 foot bed length.

But, recently, there has been a consumer trend toward extended cab pickup trucks, which have longer, roomier cabs. These trucks have greatly expanded interior cargo volume and also have a second row of seats for accommodating additional passengers. Unfortunately, most of these extended cab pickups are built on a standard wheelbase chassis because consumers prefer the driving characteristics of a shorter truck and, accordingly, the bed of these trucks is typically 6 feet long rather than 8 feet long. Although these shorter bed pickups have the towing capacity to handle fifth wheel trailers, they do not have enough clearance between the axle and the rear of the cab to allow the trailer to pivot to a 90 degree angle without contacting the cab which could damage the truck and severely injure any occupants. In most circumstances, a fifth wheel trailer will contact the cab of a short bed pickup at angles much less than 90 degrees.

One method for allowing a short bed pickup truck to pull a fifth wheel trailer is to use a sliding towing assembly as described in U.S. Pat. No. 6,308,977 ('977 patent). The '977 patent describes a sliding hitch assembly with two main parts, a base assembly and a hitch assembly. The hitch assembly attaches to the hitch pin box of a trailer; the base assembly is mounted in the bed of a vehicle. The sliding towing assembly operates by mechanically sliding the hitch pin rearward from the cab as the trailer pivots. By sliding the hitch rearward, the distance between the hitch pin and the cab increases during turns, thereby allowing turns up to 90 degrees without the trailer contacting the cab.

This aforedescribed hitch assembly can be improved upon. First, the contact between the slide plate and the guide rails causes friction and noise as the hitch assembly slides. Friction can lead to stress or strain on the components of the hitch assembly, and noise from the hitch assembly can cause discomfort or annoyance to the driver and passengers, as well as a perception of low quality construction. Second, when the truck and the trailer are aligned and the truck accelerates or decelerates the slide plate has a tendency to rock or slide.

Accordingly, there exists a need for an improved sliding towing assembly that allows fifth wheel trailers to be towed using short bed pickup trucks, but minimizes noise and friction during turning. There also exists a need to minimize hitch movement during acceleration and deceleration when the trailer and vehicle are aligned.

SUMMARY OF THE INVENTION

The sliding towing assembly, according to the present invention, allows fifth wheel trailers to be towed using short bed pickup trucks. The present sliding towing assembly allows the hitch pin to slide away from the cab, when the truck turns, with minimal friction or noise. The present sliding towing assembly holds the hitch pin in place—preventing the hitch from moving longitudinally, when the truck and trailer are aligned.

The sliding towing assembly is composed of two sub-assemblies: a hitch assembly and a base assembly. The base assembly attaches to the bed of a pickup truck. The hitch assembly latches to a king pin box, thereby connecting the hitch assembly to a trailer. The hitch assembly is carried by the base assembly. The base assembly includes two guide rails. The hitch assembly includes a bushing. The bushing is mounted on a lever arm. A bearing box is carried by the lever arm, about the bushing and contacting the guide rails, thereby guiding the bushing between the guide rails and reducing friction between the base assembly and hitch assembly. A bearing plate rests on top of the guide rails. The bearing plate is sandwiched between the hitch assembly and the guide rails to reduce friction therebetween. The bearing boxes and plates are preferably constructed from a durable plastic with a low coefficient of friction such that they can withstand the forces placed upon them during towing, and reduce friction and dampen noise. Further, the use of plastic bearings reduces the need to use grease or other lubricants on the components of the sliding towing assembly.

When the truck and trailer are aligned—that is, when the truck is not turning—the hitch assembly resides in an aligned position. The base assembly includes a stop member which contacts the bearing boxes when the hitch assembly is in the aligned position. The stop member inhibits forward motion of the hitch assembly during deceleration when the hitch assembly is in the aligned position. The base assembly also has a second stop member which prevents rearward motion of the hitch assembly during deceleration when the hitch assembly is in the aligned position.

Accordingly, it is an object of this invention to provide an improved sliding towing assembly that reduces friction in the sliding mechanism.

It is an object of this invention to provide a sliding towing assembly that dampens noise from the hitch assembly.

It is an object of this invention to provide a bearing assembly that is low in cost and high in durability and reliability.

It is an object of this invention to provide a sliding towing assembly which remains anchored during acceleration and deceleration.

These and other objects of the invention will become readily apparent to those skilled in the art upon a reading of the following description.

DESCRIPTION OF THE PREFERRED EMBODIMENT

The embodiment herein described does not intend to be exhaustive or to limit the invention to the precise form disclosed. It has been chosen and described to explain the principles of the invention and its application and practical use to best enable others skilled in the art to follow its teachings.

Figure 1:
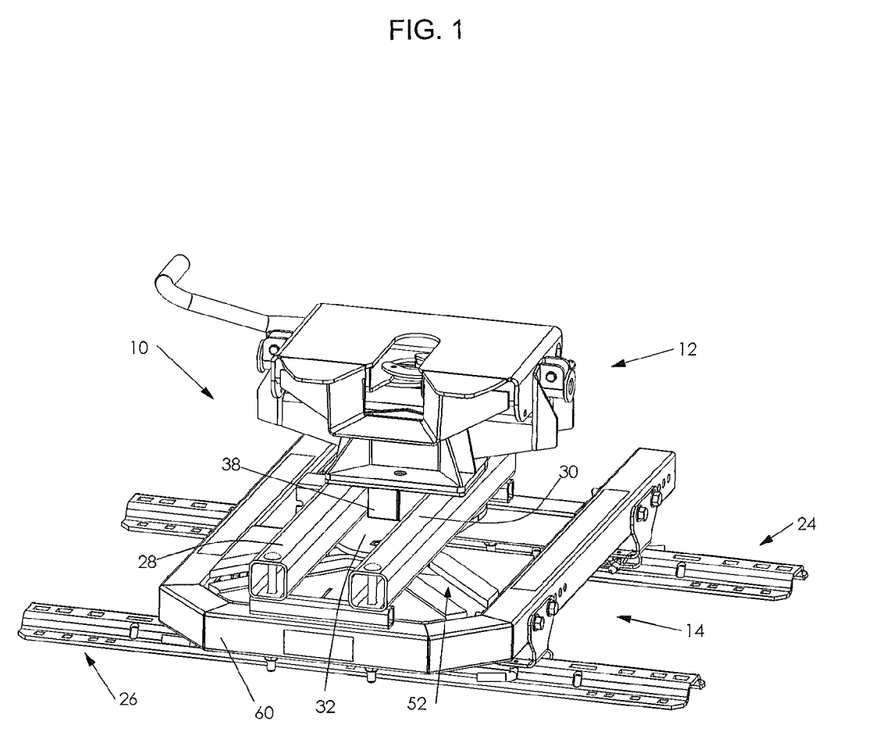
FIG. 1 is a perspective view of the sliding towing assembly shown on truck bed mounting brackets.
Figure 10:
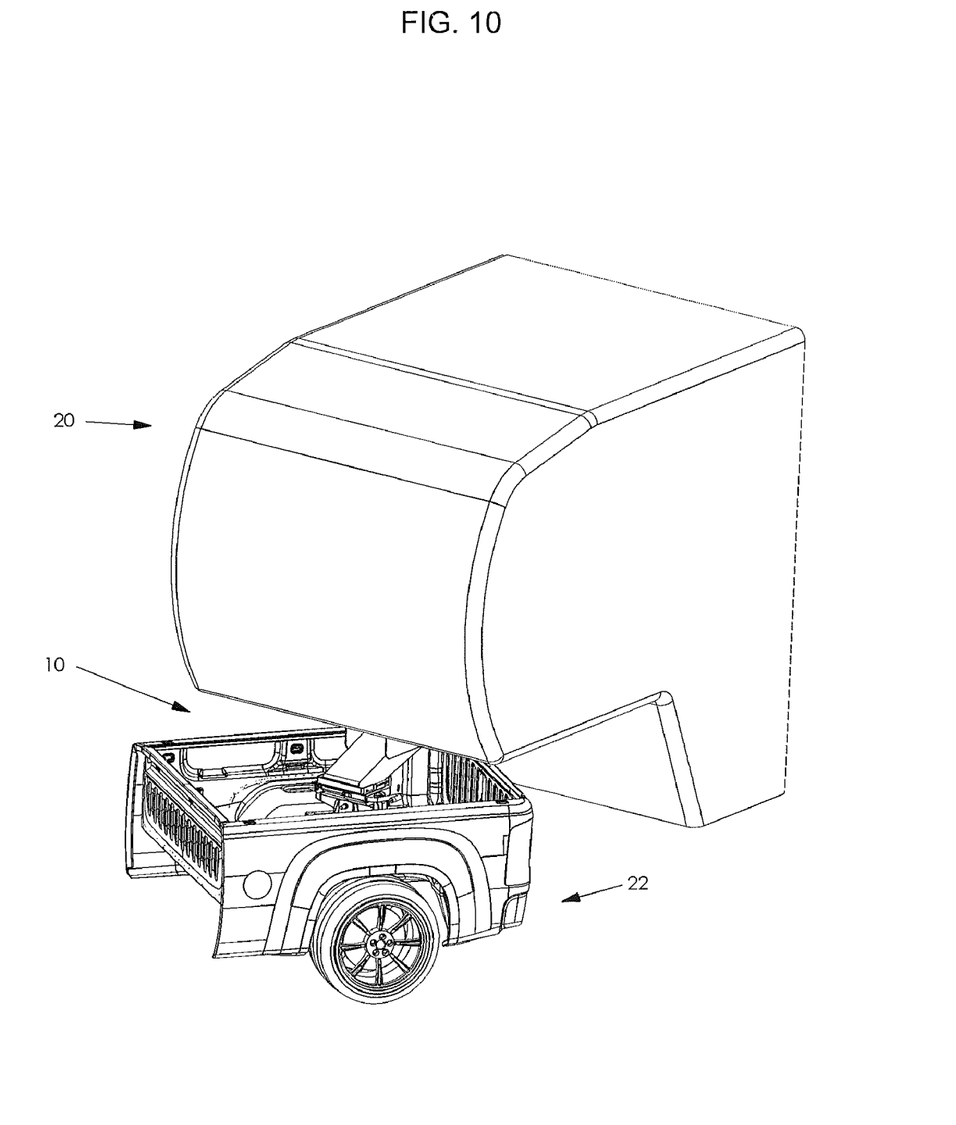
FIG. 10 is a fragmentary perspective view showing a vehicle and trailer attached together by the sliding hitch assembly.

Referring now to FIG. 1, a sliding towing assembly 10 includes two main parts: a hitch assembly 12 and a base assembly 14. Hitch assembly 12 is carried by base assembly 14. Hitch assembly 12 attaches to a trailer 20. Base assembly 14 is mounted in the bed of a truck or similar towing vehicle 22. FIG. 10 shows vehicle 22, sliding towing assembly 10 and trailer 20 in the preferred embodiment.

Base assembly 14 includes a frame 60, a left guide rail 28, a right guide rail 30, and a channel 52. Guide rails 28 and 30 and channel 52 are carried by frame 60. Frame 60 is supported by a mounting bracket 24 and mounting bracket 26 which, in turn, are fixed to vehicle 22, preferably secured to the vehicle's frame.

Figure 2:
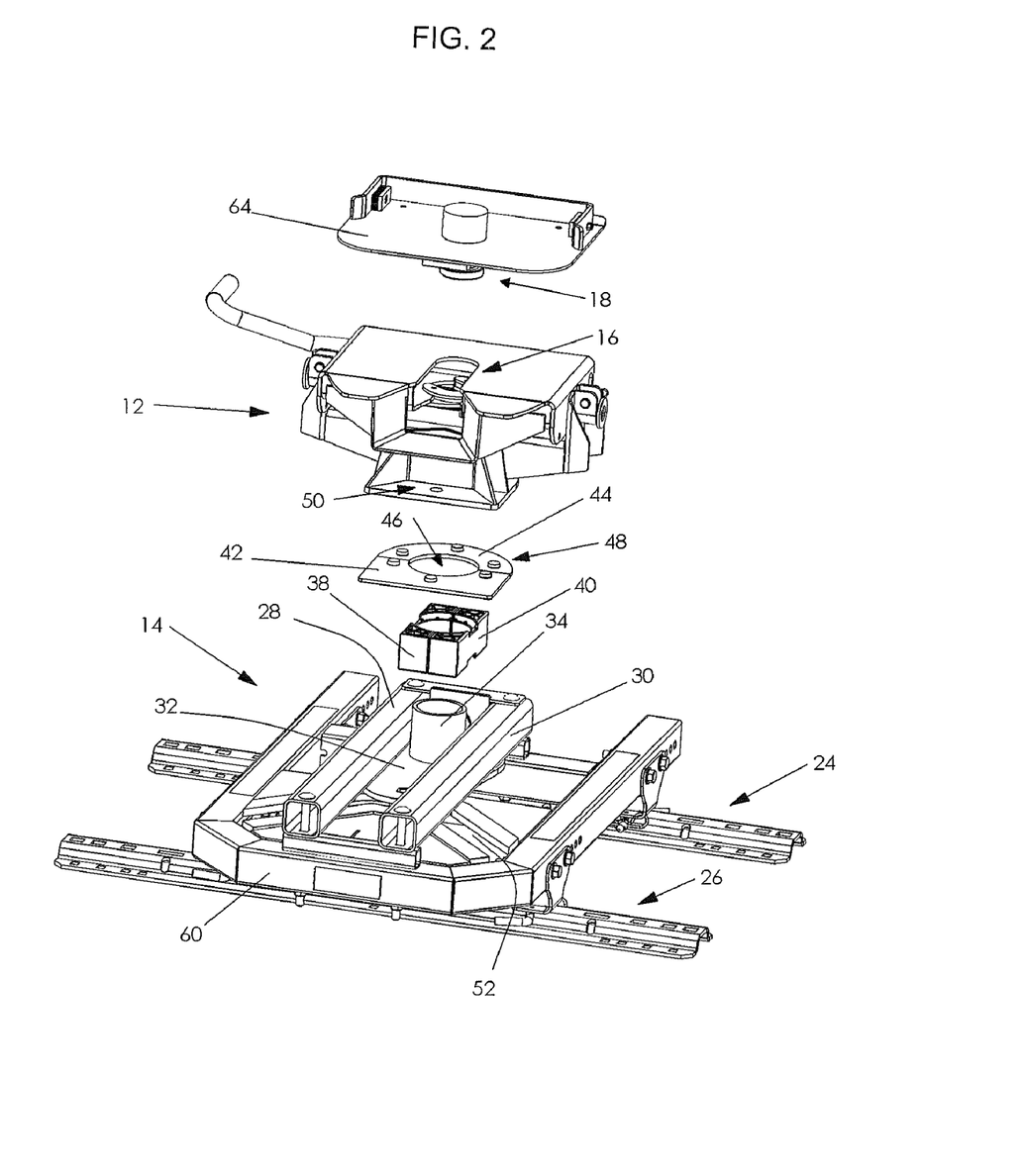
FIG. 2 is an exploded view of the sliding towing assembly showing the base assembly, bearing boxes, bearing plates, hitch assembly, capture plate and king pin.

FIG. 2 shows an exploded view of sliding towing assembly 10. Hitch assembly 12 has a latch system 16 which serves to lock onto a king pin 18 thereby securing trailer 20 to hitch assembly 12. King pin 18 is attached to trailer 20. A capture plate 64 may be attached to trailer 20, and serves to hold hitch assembly 12 in fixed angular rotation with trailer 20 at the pin box.

Figure 11:
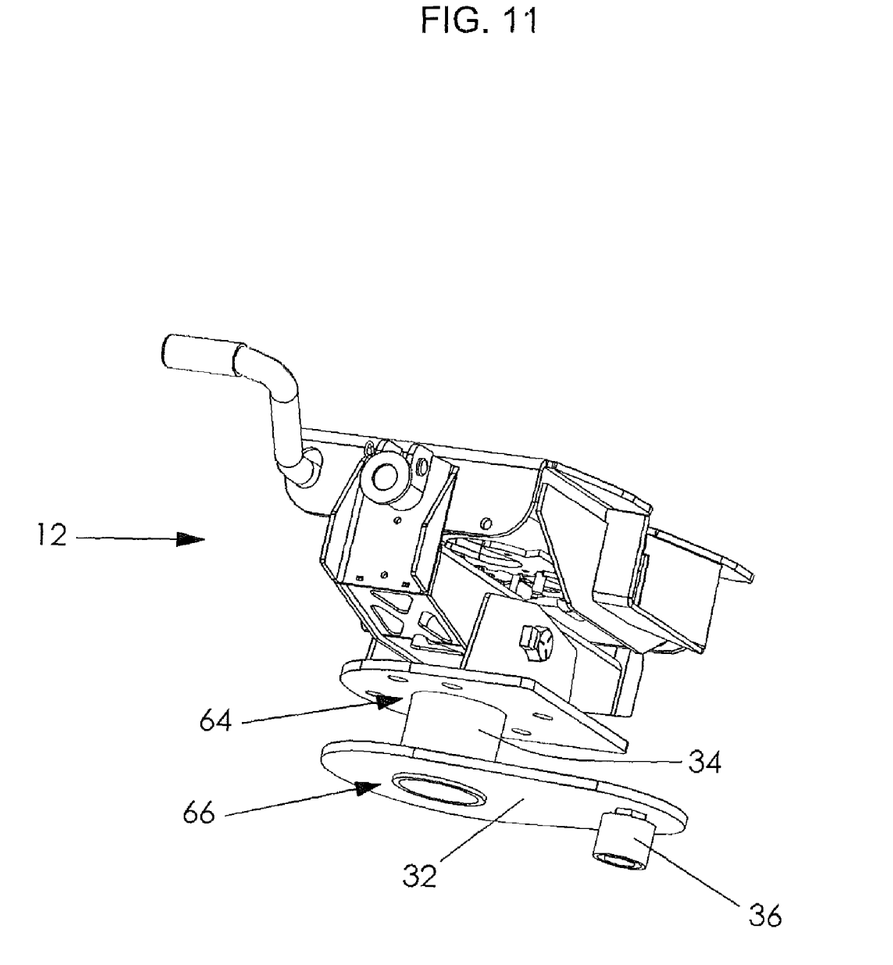
FIG. 11 is a perspective view showing the hitch assembly as mounted on the bushing and lever arm.

FIG. 11 shows hitch assembly 12. Hitch assembly 12 is connected to a bushing 34. Bushing 34 is connected to and supported on a lever arm 32. A lever arm 32 has a cam 36. Lever arm 32 is carried by cam 36. Bushing 34 is preferably fixed to lever arm 32 at seam 66 and to hitch assembly 12 at seam 64, such as by welding so that hitch assembly 12 remains in rotational alignment with lever arm 32.

Figure 4:
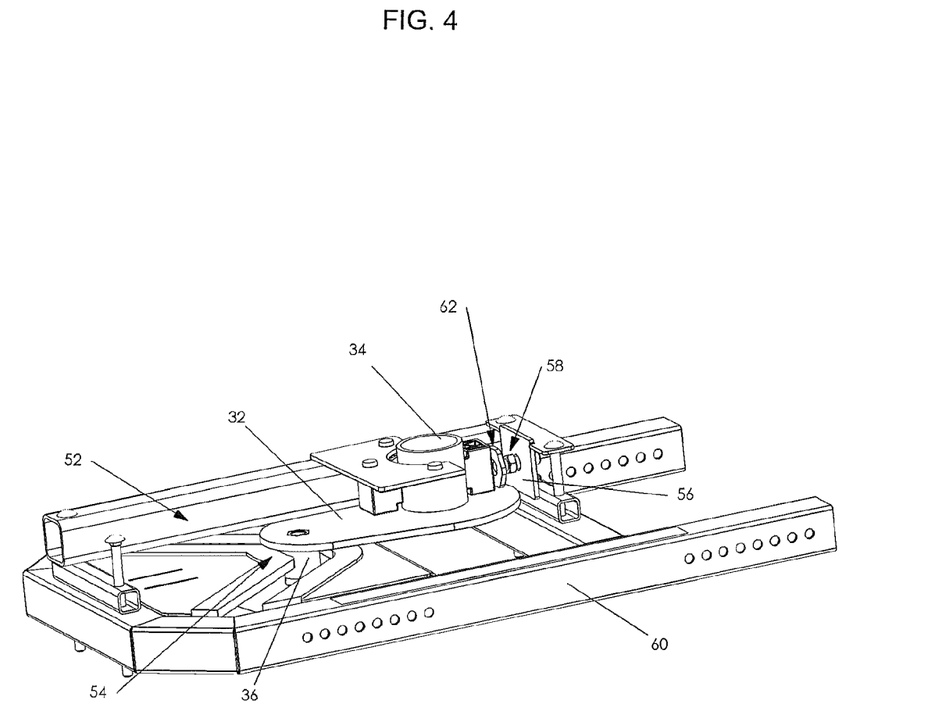
FIG. 4 is a fragmentary perspective view showing the base assembly providing a view of the stop for securing the towing assembly against fore and aft movement during straight-line movement.

Hitch assembly 12 is carried by base assembly 14, as shown in FIG. 1, by cam 36 being carried within channel 52 which serves as a cam follower, as shown in FIG. 4.

Figure 7:
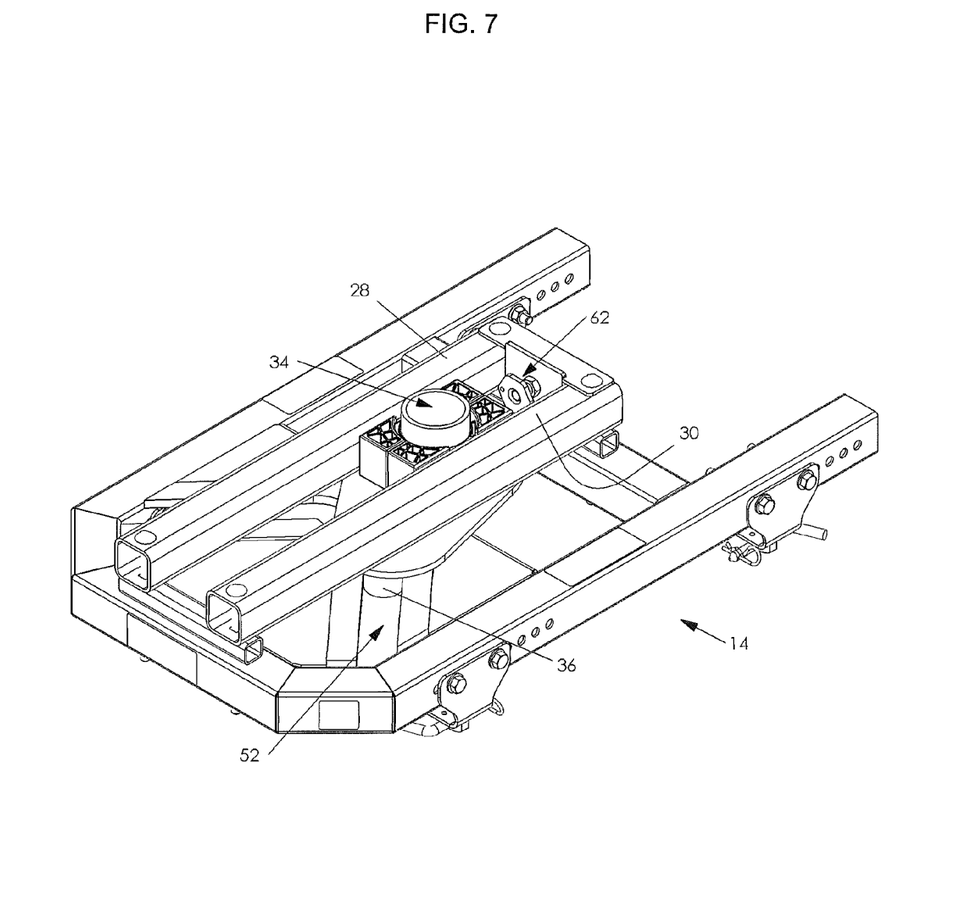
FIG. 7 shows the view from FIG. 6 without the bearing plates.

Left guide rail 28 and right guide rail 30 flank bushing 34, as is shown in FIG. 7. Guide rails 28 and 30 are preferably elongated tubes, with a generally square cross section, which attach to base assembly 14. Guide rails 28 and 30 are positioned parallel to one another with a gap therebetween.

Base assembly 14 accepts a bearing block formed for ease of assembly by a left bearing box 38 and a right bearing box 40. Bearing boxes 38 and 40 are supported on lever arm 32 and surround bushing 34 making contact therewith. Left bearing box 38 contacts left guide rail 28. Right bearing box 40 contacts right guide rail 30. A bearing pad formed for ease of assembly by a front bearing plate 42 and a rear bearing plate 44 rest on top of guide rails 28 and 30. Together, bearing plates 42 and 44 form an opening 46 through which bushing 34 extends.

Figure 3:
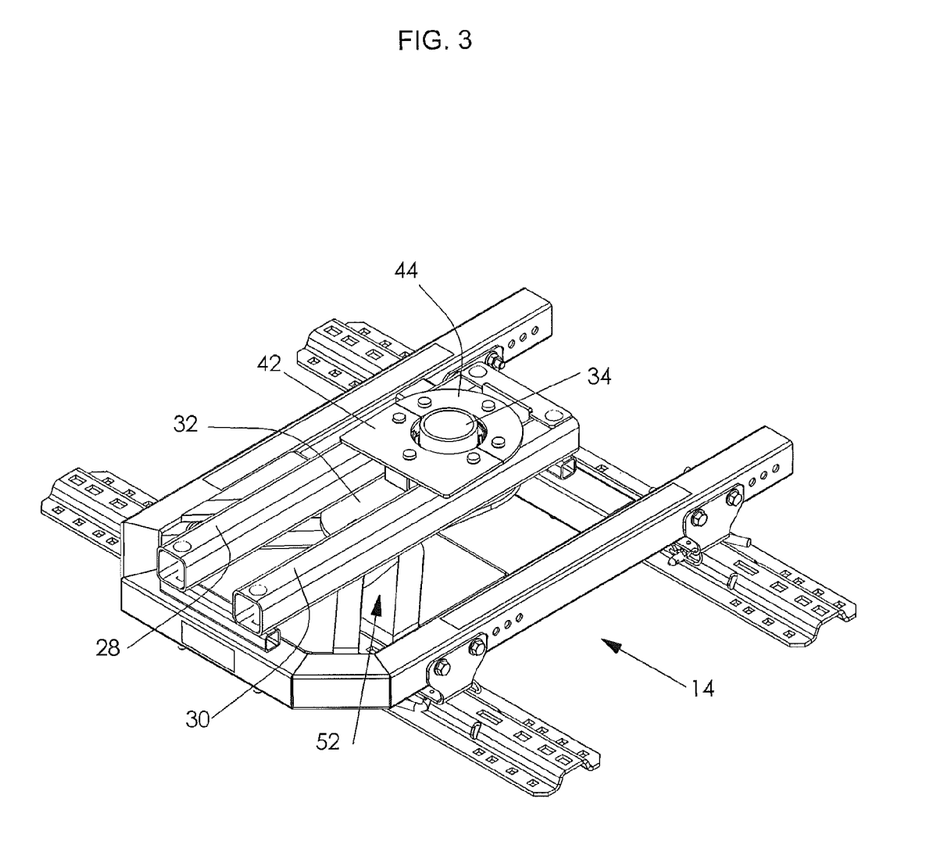
FIG. 3 is a perspective view showing the base assembly with bearing boxes and bearing plates.

FIG. 3 shows bearing boxes 38 and 40 and bearing plates 42 and 44 positioned on base assembly 14 in the preferred embodiment with bushing 34 extending therethrough. Bearing boxes 38 and 40 and bearing plates 42 and 44 are preferably not attached to each other. Bearing boxes 38 and 40 and bearing plates 42 and 44 are preferably constructed of a durable plastic which has a low coefficient of friction.

Figure 5:
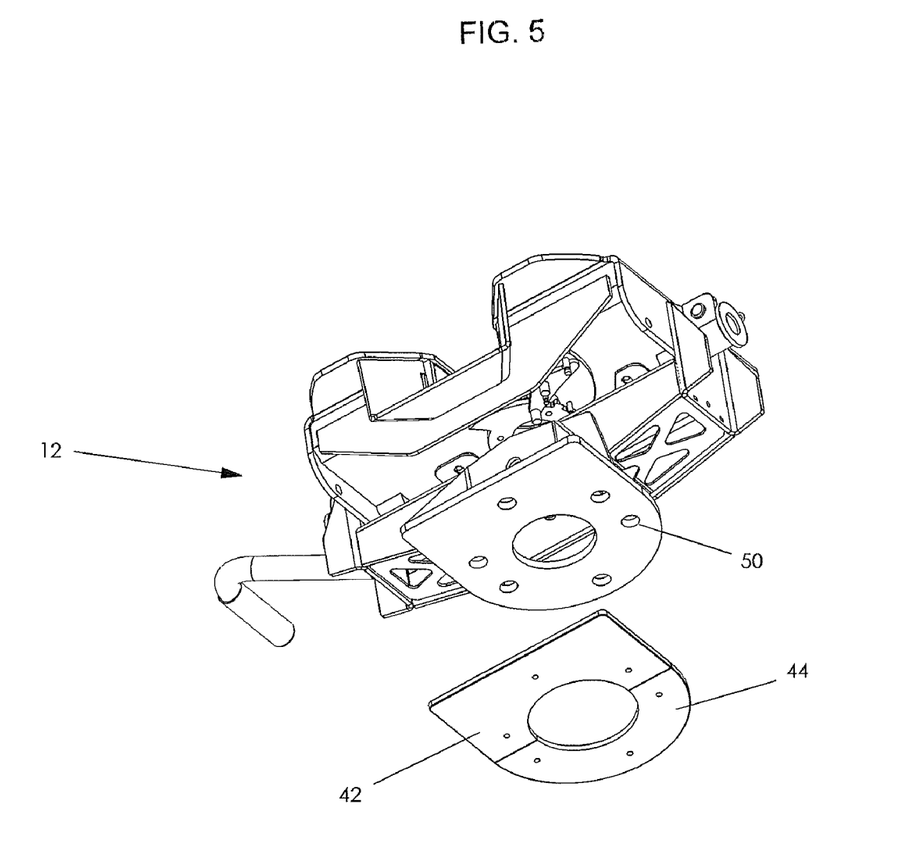
FIG. 5 is a perspective view from below showing the hitch assembly and bearing plates.

Bearing plates 42 and 44 have a number of bosses 48, best seen in FIG. 3, positioned around opening 46. Hitch assembly 12 has a number of apertures 50, as shown in FIG. 5. Bearing plates 42 and 44 are sandwiched between guide rails 28 and 30 and hitch assembly 12 such that bosses 48 fit into apertures 50, thereby preventing rotation between bearing plates 42 and 44 and hitch assembly 12. Bearing plates 42 and 44 are held between hitch assembly 12 and base assembly 14, such that they slide with hitch assembly 12 as the hitch assembly slides along guide rails 28 and 30, thereby reducing friction therebetween. FIG. 1 shows hitch assembly 12 mounted on base assembly 14.

Bearing plates 42 and 44 and bearing boxes 38 and 40 are designed to be removable from sliding towing assembly 10, such as when they are worn and need to be replaced. Removal is accomplished by detaching guide rails 28 and 30 from frame 60. With the guide rails removed, the bearing boxes can be pulled away from bushing 34, and the bearing plates will drop away from hitch assembly 12. New bearing plates and bearing boxes can be installed by following the removal steps in reverse.

FIG. 4 shows a perspective view of frame 60 and the components mounted thereon. Right guide rail 30, right bearing box 40 and rear bearing plate 44 have been removed for illustrative purposes. Cam 36 is affixed to the underside of lever arm 32. Cam 36 slides within a follower channel 52. Channel 52 is of a general V-shape with a flattened portion 54 at the base of the V. When a rotational force is exerted on lever arm 32 about bushing 34, cam 36 slides along channel 52 causing lever arm 32 and bushing 34 to slide linearly between left guide rail 28 and right guide rail 30. Left bearing box 38 and right bearing box 40 serve as a guide as bushing 34 slides between guide rails 28 and 30. In this way hitch assembly 12 moves along guide rails 28 and 30, when vehicle 22 turns, thereby increasing the turning radius of trailer 20 to prevent contact between trailer 20 and vehicle 22. Bearing boxes 38 and 40 further serve to reduce friction, dampen noise, and reduce the need for lubrication.

A plate 56 is mounted to frame 60 behind bushing 34 and opposite channel 52, as shown in FIG. 4. Plate 56 carries a set screw 58 which in turn carries a stop 62. When vehicle 22 and trailer 20 are aligned, with cam 36 within channel 52 at flattened portion 54, bearing boxes 38 and 40 contact stop 62. Bearing boxes 38 and 40 contact bushing 34, bushing 34 is connected to lever arm 32, lever arm 32 carries cam 36. Stop 62 holds the lever arm assembly flush against flattened portion 54, whereby the channel portion and stop together serve to hold lever arm 32 against longitudinal movement when vehicle 22 is axially aligned with the connected trailer, preventing hitch assembly 12 from rocking or sliding fore or aft during operation of vehicle 22.

Set screw 58 allows for adjustment of stop 62 to allow for variabilities in the manufacturing process of the various components of the sliding towing assembly 10 while still ensuring flush contact between bearing boxes 38 and 40 and stop 62 when vehicle 22 and trailer 20 are aligned. Adjustment is accomplished by adjusting set screw 58 until stop 62 is brought flush with bearing boxes 38 and 40 when hitch assembly 12 is in the aligned position.

Figure 6:
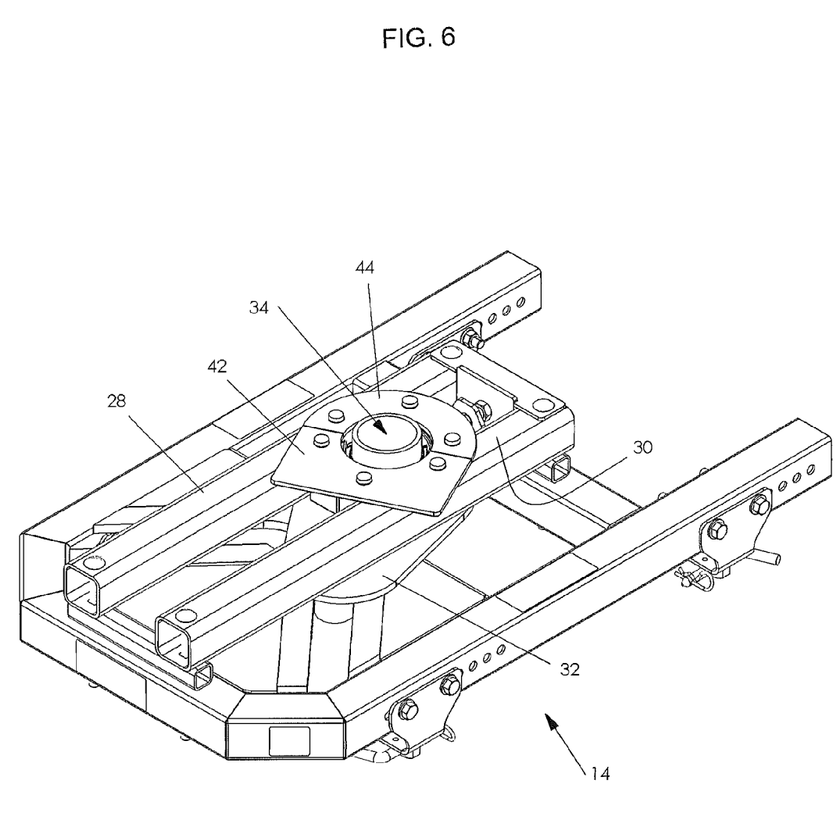
FIG. 6 is a perspective view of the base assembly showing the towing, assembly in a turned position.

FIG. 6 shows lever arm 32 pivoted into the turning position. As cam 36 travels along channel 52, lever arm 32 is guided between guide rails 28 and 30 by bearing boxes 38 and 40, thereby lengthening the radius of rotation of the trailer to avoid contact between trailer 20 and vehicle 22. Bearing plates 42 and 44 rotate with hitch assembly 12, as bearing boxes 38 and 40 travel with bushing 34 longitudinally, reducing friction between hitch assembly 12 and guide rails 28 and 30 bearing boxes 38 and 40.

FIG. 7 shows lever arm 32 in the turning position, with bearing plates 42 and 44 removed. As a rotational force is exerted on bushing 34 by hitch assembly 12 which is connected to trailer 20, cam 36 travels along channel 52 which in turn causes lever arm 32 to carry bushing 34 along guide rails 28 and 30, causing bearing boxes 38 and 40 to slide away from stop 62.

Figure 8:
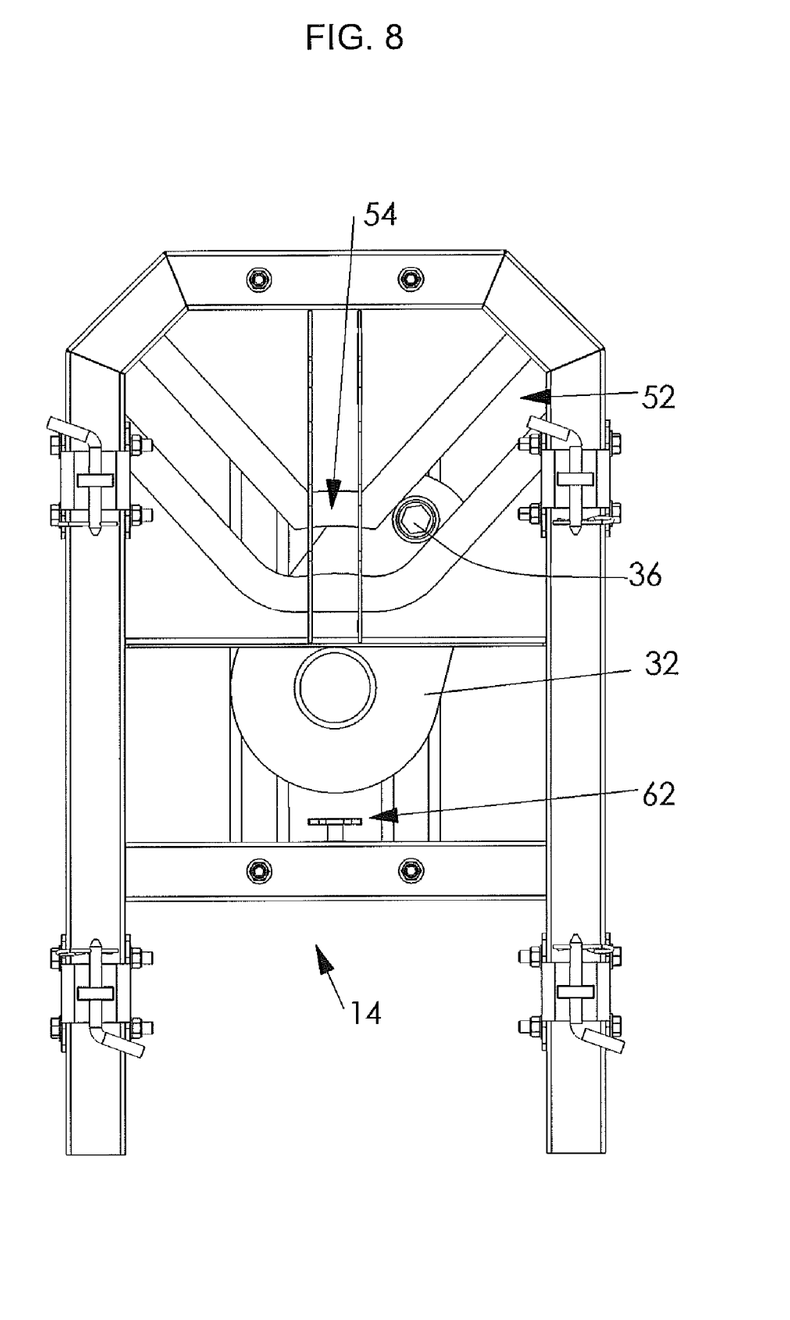
FIG. 8 is a bottom view of the base assembly, as seen in FIG. 6.

FIG. 8 is a view of base assembly 14 as viewed from below. Lever arm 32 is in the turning position with cam 36 traveling along channel 52. This view shows that as cam 36 travels along channel 52, lever arm 32 moves away from stop 62. By sliding lever arm 32 away from stop 62, the turning radius of trailer 20 is elongated so as to avoid contacting vehicle 22. Flattened portion 54 is slightly concave, forming an arcuate trough, and thus provides some resistance against cam 36 moving away from portion 54. This concave shape helps prevent unwanted lateral sliding of the cam when the vehicle and trailer are aligned, as the concave shape will cause the cam to remain at the bottom of the trough when bumps or jolts from driving may otherwise cause the cam to rock laterally. Stop 62 braces cam 36 against portion 54 when in the aligned position to prevent longitudinal motion.

Hitch assembly 12 is mounted in fixed rotational contact with trailer 20. When vehicle 22 makes a turn, trailer 20 pivots relative to vehicle 22. Hitch assembly 12 is in fixed rotational contact with bushing 34, bushing 34 is in fixed rotational contact with lever arm 32. When trailer 20 pivots, rotational motion causes lever arm 32 to move cam 36 along channel 52. Channel 52 is shaped such that as cam 36 moves laterally, it also pulls lever arm 32 longitudinally, which in turn moves hitch assembly 12 relative to base assembly 14 and away from the cab of vehicle 22, thus allowing for a large enough turn radius to prevent trailer 20 from contacting trailer 22.

Figure 9:
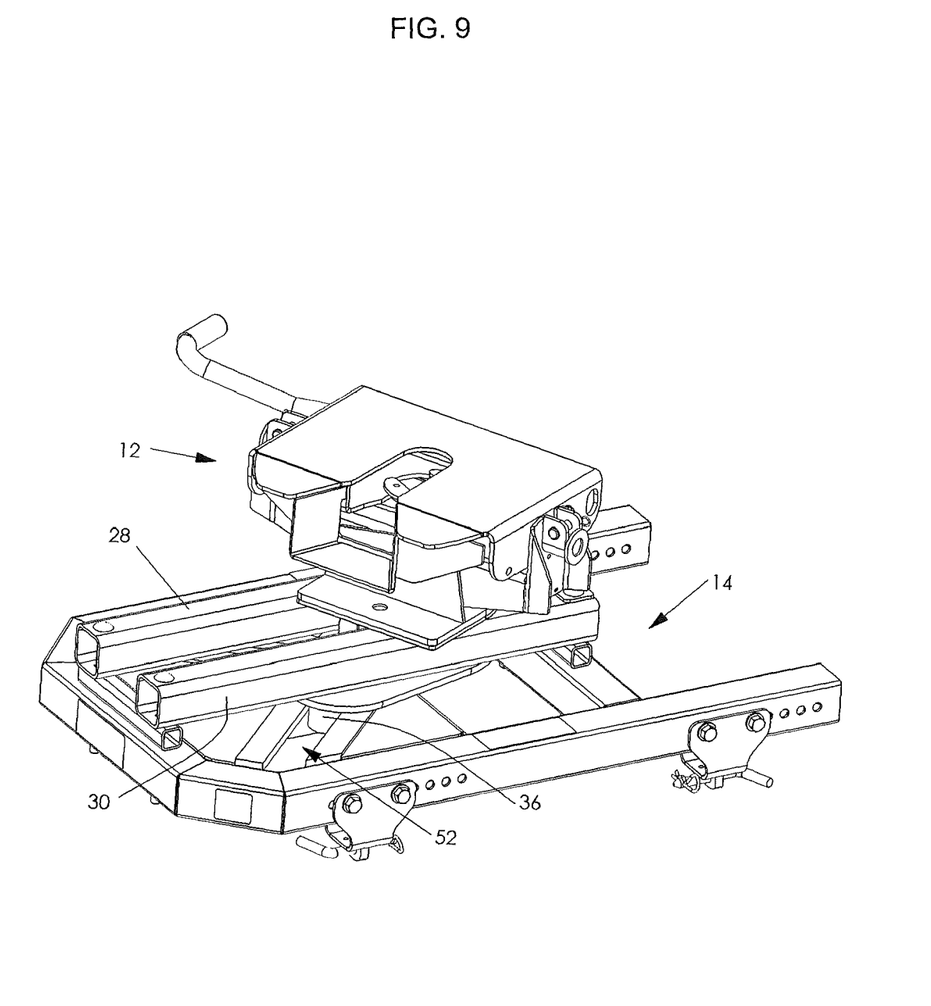
FIG. 9 is a perspective view of the hitch assembly mounted on the base assembly with the lever arm rotated and pivoted along the base assembly.

FIG. 9 shows sliding towing assembly 10 in the turning position. This view shows hitch assembly 12 rotated relative to base assembly 14, which causes cam 36 to travel along channel 52 which in turn slides hitch assembly 12 along guide rails 28 and 30.

What is claimed is:

1. A sliding towing assembly, comprising:
a base assembly mounted to a vehicle;
a hitch assembly attachable to a trailer such that said hitch assembly is in fixed alignment with said trailer, said hitch assembly movably mounted to said base assembly and pivoting between an aligned position and a turning position relative to said base assembly, said aligned position defined by said vehicle and said trailer aligned along a common axis, said turning position defined by said vehicle in angular rotation relative to said trailer, said hitch assembly moving longitudinally along said base assembly when pivoting between said aligned position and said turning position; and
a bearing assembly nested between said hitch assembly and said base assembly, said bearing assembly serving to guide said hitch assembly as it moves between said turning position and said aligned position, said bearing assembly reducing friction between said base assembly and said hitch assembly, said bearing assembly dampening noise, said bearing assembly including a bearing box.

2. Sliding towing assembly as claimed in claim 1, said hitch assembly having a bushing, said bearing box surrounding said bushing.

3. Sliding towing assembly as claimed in claim 2, said base assembly having a first and a second guide rail, said bearing box fitted between said rails for guiding said hitch assembly along said guide rails as said hitch assembly pivots between said aligned position and said turning position.

4. Sliding towing assembly as claimed in claim 3, said bearing assembly including a bearing plate.

5. Sliding towing assembly as claimed in claim 4, said bearing riding between said hitch assembly and said guide rails.

6. Sliding towing assembly as claimed in claim 5, said hitch assembly having a bottom, said bottom having one or more apertures, said bearing plate having one or more bosses, said bosses fitting in corresponding apertures on said bottom such that said bearing plate is in fixed rotational contact with said hitch assembly.

7. A sliding towing assembly, comprising:
a base assembly mounted to a vehicle;
a hitch assembly attachable to a trailer such that said hitch assembly is in fixed alignment with said trailer, said hitch assembly movably mounted to said base assembly and pivoting about a bushing between an aligned position and a turning position relative to said base assembly;
a bearing box nested between said hitch assembly and said base assembly.

8. The sliding towing assembly of claim 7, wherein said bearing box is defined by a first box and a second box which together circumscribe said bushing.

9. The sliding towing assembly of claim 8, wherein said first box and said second box maintain fixed rotational alignment with said base assembly.

10. The sliding towing assembly of claim 7, and said hitch assembly having a first guide rail and a second guide rail, a bearing pad riding along said first and second guide rails.

11. The sliding towing assembly of claim 10, wherein said bearing plate is formed having a first plate and a second plate which together encircle said bushing.

12. The sliding towing assembly of claim 11, said first and second plate attached to said hitch assembly by a fastener, said fastener holding said first and second plates in fixed rotational contact with said hitch assembly.

13. A sliding towing assembly, comprising:
a base assembly mounted to a vehicle;
a hitch assembly attachable to a trailer such that said hitch assembly is in fixed alignment with said trailer, said hitch assembly movably mounted to said base assembly and pivoting about a bushing between an aligned position and a turning position relative to said base assembly; and
a bearing assembly nested between said hitch assembly and said base assembly, said bearing assembly defined by a first bearing and a second bearing, said first bearing partially encircling said bushing, said second bearing partially encircling said bushing.

14. The sliding towing assembly of claim 13, wherein said first bearing and said second bearing together encircle said bushing.

15. The sliding towing assembly of claim 14, wherein said first bearing is a bearing box having a semi-circular cutout, said second bearing is a bearing box having a semi-circular cutout.

16. The sliding towing assembly of claim 14, and said hitch assembly having a first guide rail and a second guide rail, said first bearing is generally flat with a semi-circular cutout, said second bearing is generally flat with a semi-circular cutout, said first and second bearings riding along said first and second guide rails.

17. The sliding towing assembly of claim 16, said first and second bearings attached to said hitch assembly by a fastener, said fastener holding said first and second bearings in fixed rotational contact with said hitch assembly.

18. The sliding towing assembly of claim 16, and a first bearing box having a semi-circular cutout, and a second bearing box having a semi-circular cutout, said first and second bearing blocks encircling said bushing.

19. The sliding towing assembly of claim 18, wherein said hitch assembly moves longitudinally relative said base assembly when turning between said aligned position and said turning position, said first and second bearing blocks guiding said bushing between said first and second guide rails as said hitch assembly moves longitudinally relative said base assembly.

20. The sliding towing assembly of claim 19, wherein said first and second bearing boxes maintain rotational alignment with said base assembly.

\* \* \* \* \*